United States Patent [19]

Herrmann et al.

[11] Patent Number: 5,359,153
[45] Date of Patent: Oct. 25, 1994

[54] PORTABLE, CLEAN-IN-PLACE INDUSTRIAL FLOOR SCALE

[75] Inventors: Frederick Herrmann; Gregory A. Morris, both of Terre Haute, Ind.

[73] Assignee: Indiana Scale Co., Inc., Terre Haute, Ind.

[21] Appl. No.: 70,217

[22] Filed: Jun. 2, 1993

[51] Int. Cl.$^5$ .................. G01G 21/00; G01G 19/02
[52] U.S. Cl. ........................ 177/176; 177/134
[58] Field of Search ............. 177/126, 127, 134, 135

[56] References Cited

U.S. PATENT DOCUMENTS

| | | | |
|---|---|---|---|
| 3,935,914 | 2/1976 | Nordstrom et al. | 177/134 |
| 4,258,814 | 3/1981 | Dillon | 177/126 |
| 4,350,218 | 9/1982 | Soderholm | 177/211 X |
| 4,453,606 | 6/1984 | Mokhbery et al. | 177/126 |
| 4,957,178 | 9/1990 | Mills | 177/134 |

*Primary Examiner*—George H. Miller, Jr.
*Attorney, Agent, or Firm*—H. John Barnett

[57] ABSTRACT

This invention is directed to a clean-in-place, industrial floor scale having a removable deck and a weighing capacity up to about 5,000 pounds. The removable deck is fabricated from a nonmetallic material such as a polyethylene or polypropylene sheet, or a reinforced fiberglass and weighs less than about eighty pounds. The base frame of the scale is preferably stainless steel, and is also relatively lightweight, being about 140 pounds. One worker can lift and move the floor scale for daily sanitary cleaning when it is used in a food, chemical or pharmaceutical plant, without requiring a forklift, hoist or other motorized equipment.

5 Claims, 1 Drawing Sheet

PORTABLE, CLEAN-IN-PLACE INDUSTRIAL FLOOR SCALE

BACKGROUND OF THE INVENTION

1. Field Of the Invention

This invention relates to industrial floor scales having load cells or strain gauges connected to a metal frame having a load-bearing platform to weigh industrial materials up to about 5,000 pounds. Until now, such scales have been of unitary structure, and have weighed in excess of three hundred thirty pounds, and could not be carried or moved by a single worker.

2. Description of the Related Art

The following patents relate to platform scales:

| Patent Number | Inventor | Date |
|---|---|---|
| 2,499,033 | Oberholtzer | 1950 |
| 3,512,595 | Laimins | 1970 |
| 3,666,032 | Maffia, et al | 1972 |
| 3,933,212 | Bradley, et al | 1976 |
| 4,261,428 | Bradley | 1981 |
| 4,350,218 | Soderholm | 1982 |
| 4,874,050 | Strasser, et al | 1989 |
| 4,949,798 | Strasser, et al | 1990. |

Oberholtzer's weighing platform is bolted to four beams which are bolted to corresponding corner posts which are rigidly attached to a base member. A strain gauge is bonded to each beam to measure strain from impact loads on the platform. Laimins' scale has a load platform comprising hardwood planks which are secured to the underlying framework. Laimins describes a foundation for his scale, so it would not appear to be portable. A second embodiment of Laimins' scale is limited to 500 pound capacity (Col. 7, lines 49 ff.). It is not stated whether this scale is portable.

Maffia, et al describe a bench and portable platform scale in which force applied to the scale platform is transmitted to a transfer lever arm through flexure plates. This patent states that the weighing platform is supported by the four corner posts, but the description does not state whether the weighing platform is attached. In any event, such scales are relatively limited in capacity compared to industrial floor scales. This scale is described as having a 1,500 pound capacity. The material of the platform is not described, but it is believed to be steel, because the frame is steel.

Bradley, et al '212 is primarily concerned with making a very low profile platform scale having a two layer platform which is bolted together. Bradley, et al '428 includes a single load cell and elaborate stabilizing means interconnected between the base platform and the load supporting platform.

Soderholm U.S. Pat. No. 4,350,218 describes a platform scale having four load cells, one in each corner. The platform is connected to the frame.

Strasser, et al U.S. Pat. Nos. 4,874,050 and 4,949,798 describe "portable" deck truck scales which have deck structures reinforced with "V" shaped support ribs. The deck in U.S. Pat. No. 4,874,050 is concrete poured on a metal deck, and the scale is said to be "portable". The deck in U.S. Pat. No. 4,949,798 is similar, but does not include poured concrete. "Portability", as used in these patents, is not believed to mean "movable" by a single worker, but transportable by a front end loader, or other large mechanical device.

SUMMARY OF THE INVENTION

This invention is directed to a Clean-in-place, industrial floor scale having a removable deck and a weighing capacity up to about 5,000 pounds. The removable deck is fabricated from a nonmetallic material such as a polyethylene or polypropylene sheet, or a reinforced fiberglass, and weighs less than about eighty pounds. The base frame of the scale is preferable stainless steel, and is also relatively lightweight, being about 140 pounds. One worker can lift and move the floor scale for daily sanitary cleaning when it is used in a food, chemical or pharmaceutical plant.

The simple, two-piece lightweight construction is amazingly durable in an industrial environment. Even a twenty thousand pound truck crossing over the scale has not damaged either the platform or the frame of this scale.

The base frame has four equilateral sides having reinforcing struts extending diagonally across between the opposing corners. Load cell mounting plates are provided in each corner. One end of each load cell is rigidly fastened to the corresponding mounting plate, and the other end of the load cell is cantilevered from the mounting plate and receives one of four adjustable support legs which support the base frame slightly above the floor. The cantilever arm of each load cell electronically measures a part of the total weight of material to be weighed which is placed on the scale platform, and a conventional electronic circuit converts the signals from all four load cells to the total weight of the material being weighed.

The four equilateral sides have raised outer vertical corner flanges and an inner, horizontal flange to receive and support the removable deck. The upper horizontal surfaces of the reinforcing struts are in the same horizontal plane as the inner horizontal flanges of the sides, and also support the removable deck. In the presently preferred embodiment, two pairs of parallel reinforcing struts interconnect the opposite corners of the base frame. The reinforcing struts intersect at the center of the base frame to provide extra reinforcement to the frame and support to the removable deck to minimize distortion under heavy loads.

DESCRIPTION OF THE PREFERRED EMBODIMENT

Figure 1:
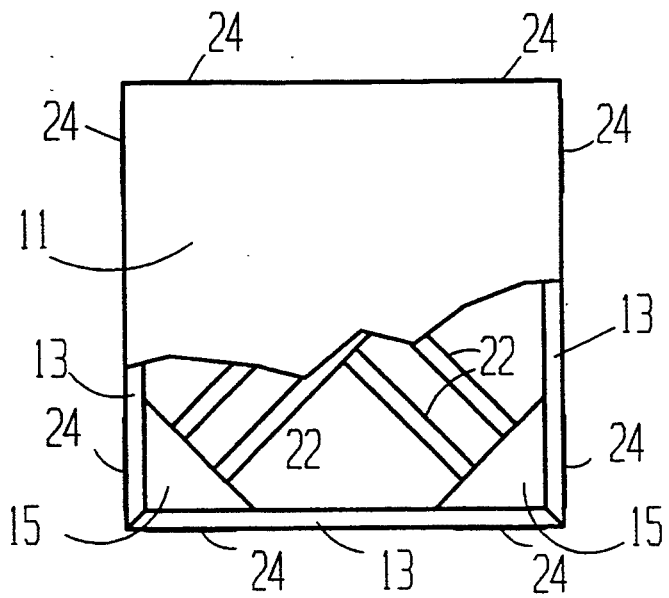
FIG. 1 of the drawings is a schematic top plan view of the two-part industrial floor scale of the invention with some parts broken away to expose a corner-located load cell.

As seen in the drawings, the two-part, industrial floor scale 10 comprises a removable deck 11 and a base frame 12. The deck 11 is preferably about four foot square, and is about one inch thick. The presently preferred material for the deck 11 is polyethylene, available from E.I DuPont Company, Wilmington, Del., and its local distributors under the brand name "Sanatec". The deck material is currently marketed under the catalog designation, "PE-F, High Density" by Multiplastics, Inc. Madison, Tenn. 37115. The total weight of the deck 11 is less than 80 pounds, so that one or two workers can manually remove the deck 11 from the base frame 12 for cleaning the scale 10.

The base frame 12 comprises four equal sides 13, which are welded together in a unitary frame which is slightly larger than the deck 11, so that the deck 11 is supported by the sides 13 when in place on the base frame 12. Each corner 14 of base frame 12 has a strongly reinforced corner bracket 15, which receives a load cell 16. Each load cell 16 is connected at its inner end 17 to the corner bracket 15 by bolts 18.

Mounting platforms 17 A are welded to the underside of each corner bracket 15 to space each outer end 19 of the load cells 16 away from the under surface of the corner bracket 15. The outer end 19 of each load cell 16 is cantilevered outwardly, and is supported just above the ground or floor by a support leg 20, which is threadably received in the bottom of the outer end 19 of each load cell 16.

Load cells 16 are presently obtained from ARTECH INDUSTRIES, INC., Whittier Calif. A Model 30310 Rectangular Shear Beam Load Cell is employed, which has a 2,500 pound capacity. The load cells 16 are connected by conductor cables 21 to a conventional circuit 21 A and display (not shown), which add up and show the total weight of the object being weighed.

Each corner bracket 15 is reinforced by a pair of diagonal struts 22, which are welded to the corner brackets 15 and extend between opposing corner brackets 15. The two pairs of struts 22 intersect at the central area of base frame 12 to define a welded, reinforcing box 23.

The sides 13 of base frame 12 include welded vertical, outer corner flanges 24 just above each corner bracket 15 for enclosing corner edges 25 of the deck 11 to hold it in place. Each side 13 also includes a horizontal inner flange 26, which supports the deck 11, along with the corner brackets 15, the diagonal struts 22 and the reinforcing box 23.

The base frame 12 is preferably made from stainless steel for ease of cleaning and maintenance. The base frame 12 weighs less than about 140 pounds, so that one or two workers can move it manually, either for cleaning, or to relocate it for a new application, without requiring a forklift, hoist, or other motorized equipment.

Figure 2:
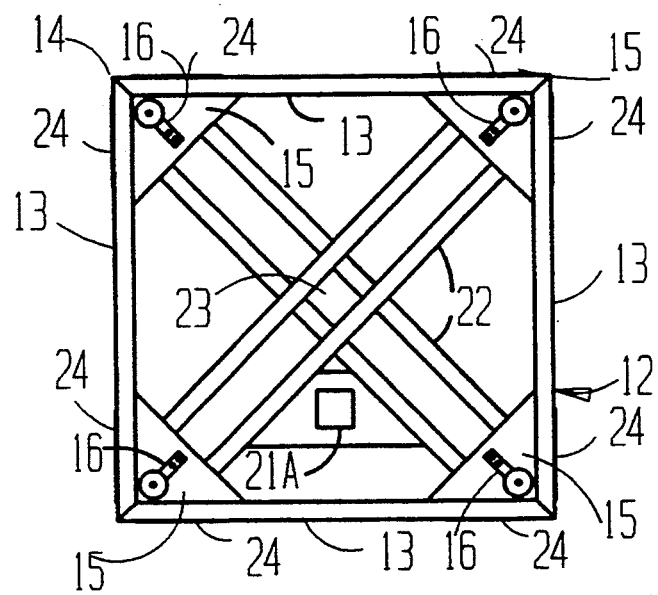
FIG. 2 is a schematic bottom plan view of the base frame with some parts broken away to show the overall reinforcing structure and the load cell support.
Figure 3:
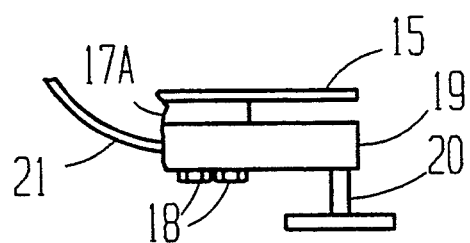
FIG. 3 is an enlarged detail side view, with some parts broken away, reoriented 180 deg. for clarity, and showing the cantilever support provided to the floor scale by the corner-located load cells.

As can be best seen in FIGS. 2 and 3, the total base frame 12 and deck 11 are supported by support legs 20 through strain gauges 16, one of which is connected to each corner bracket 15. As mentioned above, each load cell 16 is connected by conductors 21 to a conventional circuit 21 A and display (not shown). The circuit sums up and displays the total weight input from each of the four load cells 16 to display the total weight of the object on the deck 11.

What is claimed is:

1. A portable, industrial floor scale having a weighing capacity of about 5,000 pounds comprising:
   a non-metallic platform having four corner edges, and top and bottom surfaces, and which weighs less than about eighty pounds;
   a metallic base frame having four reinforced corner brackets, outer vertical flanges extending around the corners of the base frame above the corner brackets to enclose the corner edges of the non-metallic platform, and horizontally disposed reinforcing struts interconnecting the opposed corner brackets to further strengthen the base frame, the base frame weighing less than about two hundred pounds;
   cantilevered load cells, each having first and second ends, and each being disposed below, and attached at its first end to one of the reinforced corner brackets; and
   a support leg attached to each load cell at its second end so that the floor scale and any load thereon is totally supported by the load cells disposed at each reinforced corner bracket, the platform and base frame of said platform scale being easily moved by one or two workers by merely separating the platform from the base frame and moving them separately to facilitate cleaning and relocation without requiring a forklift, hoist, or other motorized equipment.

2. The industrial floor scale of claim 1, in which the platform and base frame are substantially square, and the reinforcing struts comprise two pairs of parallel struts extending between opposite corner brackets and intersecting at the center of the base frame to define a rigid, diamond-shaped reinforcing box at the center of the base frame.

3. The industrial floor scale of claim 2, in which the base frame consists essentially of stainless steel to resist corrosion and facilitate frequent cleaning.

4. The industrial floor scale of claim 3, in which each load cell has a load capacity of about 2,500 pounds.

5. The industrial floor scale of claim 2, in which the total weight of the base frame is about 140 pounds.

* * * * *